(12) United States Patent
Reddy (10) Patent No.: US 12,526,468 B2
(45) Date of Patent: Jan. 13, 2026

(54) GENERATING SYNC SIGNALS (71) Applicant: Microchip Technology Incorporated, Chandler, AZ (US)

(72) Inventor: Battu Prakash Reddy, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/318,552

(22) Filed: May 16, 2023

(65) Prior Publication Data

US 2023/0421836 A1 Dec. 28, 2023

(30) Foreign Application Priority Data

Jun. 24, 2022 (IN) .............................. 202241036390

(51) Int. Cl.
*H04N 21/43* (2011.01)
(52) U.S. Cl.
CPC ............................... *H04N 21/4302* (2013.01)
(58) Field of Classification Search
CPC ................................................ H04N 21/4302
See application file for complete search history.

(56) References Cited

U.S. PATENT DOCUMENTS 9,113,192 B2 * 8/2015 Nishio ............... H04N 21/4302

OTHER PUBLICATIONS

Video Electronics Standards Association (VESA) and Industry Standards and Guidelines for Computer Display Monitor Timing (DMT) Version 1.0, Revision 11, published May 1, 2007 by the Video Electronics Standard Association of Milpitas California.
International Search Report for International Application No. PCT/US2023/067071, mailed Jul. 31, 2023, 5 pages.
International Written Opinion for International Application No. PCT/US2023/067071, mailed Jul. 31, 2023, 12 pages.

* cited by examiner

*Primary Examiner* — Michael H Hong
(74) *Attorney, Agent, or Firm* — TraskBritt (57) ABSTRACT

Examples relate to generating sync signals. An example apparatus includes an output, an input and a circuit. The output provides a data-valid signal to a video source operative to provide video data to a video-data-processing pipeline. The input receives a delayed data-valid signal from the video-data-processing pipeline. The circuit to generate a delayed horizontal-sync signal and a delayed vertical-sync signal at least partially responsive to the received delayed data-valid signal.

21 Claims, 6 Drawing Sheets

GENERATING SYNC SIGNALS

CROSS-REFERENCE TO RELATED APPLICATION

This application claims the benefit of the priority date of Indian Provisional Patent Application No. 202241036390, filed Jun. 24, 2022, and titled "VIDEO-TIMING GENERATOR," the disclosure of which is incorporated herein in its entirety by this reference.

FIELD

This description relates, generally, to generating timing signals. More specifically, some examples relate to a video-timing generator to generate a data-valid signal, a horizontal-sync signal, and a vertical-sync signal, without limitation.

BACKGROUND

A video-timing generator may generate one or more timing signals, including a data-valid signal, a horizontal-sync signal, and a vertical-sync signal according to the timing specification of a specific protocol such as the Video Electronics Standards Association (VESA) and Industry Standards and Guidelines for Computer Display Monitor Timing (DMT) Version 1.0, Revision 11, published May 1, 2007 by the Video Electronics Standard Association of Milpitas California. A video-processing pipeline and/or a display may use the timing signals when displaying images and/or playing sounds.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In this description the term "coupled" and derivatives thereof may be used to indicate that two elements co-operate or interact with each other. When an element is described as being "coupled" to or with another element, then the elements may be in direct physical or electrical contact or there may be one or more intervening elements or layers present. In contrast, when an element is described as being "directly coupled" to or with another element, then there are no intervening elements or layers present. It will be understood that when an element is referred to as "coupling" a first element and a second element then it is coupled to the first element and it is coupled to the second element.

Figure 1:
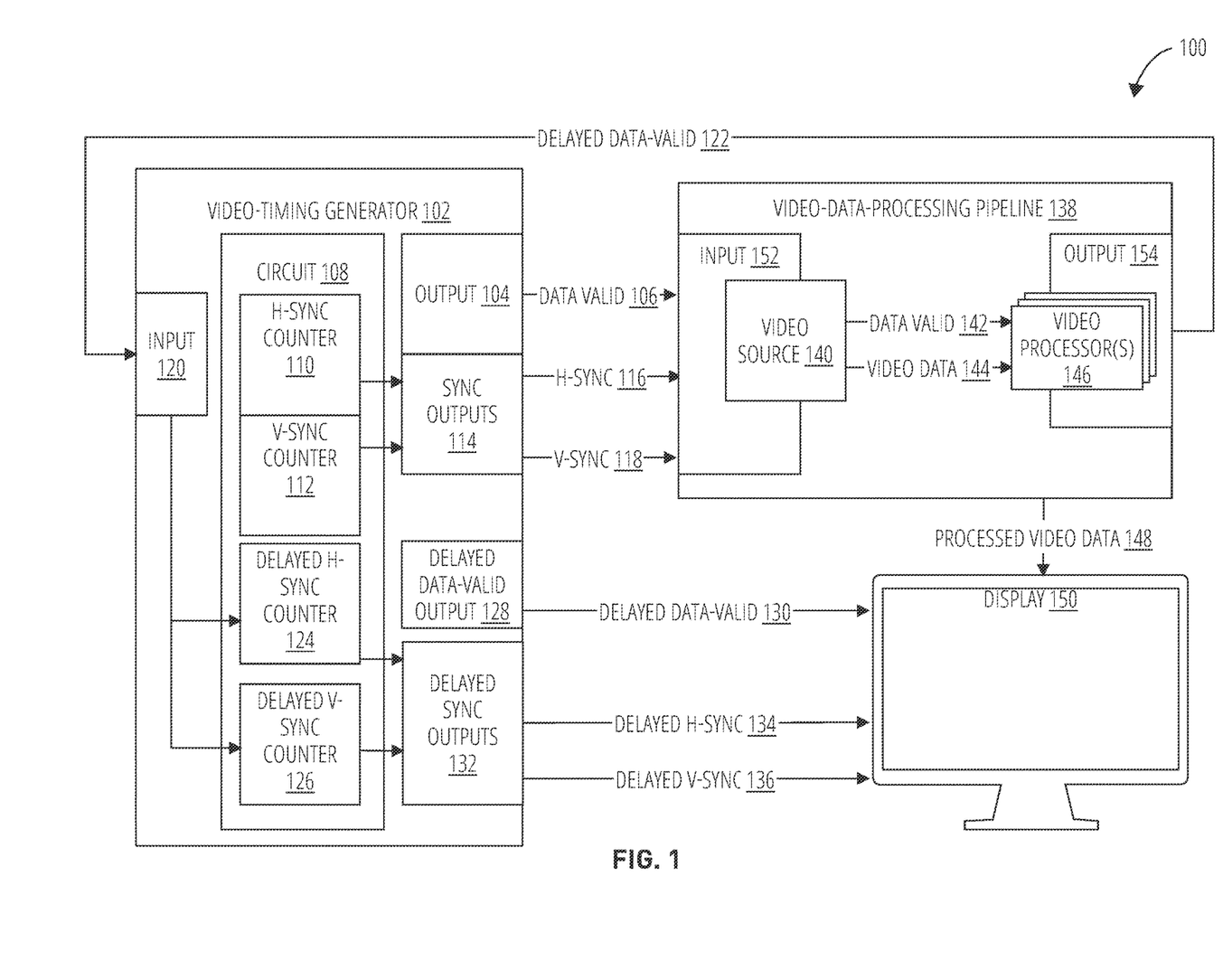
FIG. 1 is a functional block diagram depicting a system according to one or more examples.

FIG. 1 is a functional block diagram depicting a system 100 according to one or more examples. System 100 may include a video-timing generator 102, a video-data-processing pipeline 138, and a display 150.

Video-timing generator 102 may, among other things, provide (e.g., generate, provide, or both, without limitation) delayed sync signals, including, as non-limiting examples, a delayed horizontal-sync signal 134 (which delayed horizontal-sync signal 134 may be referred to herein alternatively as "delayed h-sync 134") and/or a delayed vertical-sync signal 136 (which delayed vertical-sync signal 136 may be referred to herein alternatively as "delayed v-sync 136").

Video-timing generator 102 may include an output 104, sync outputs 114, a delayed data-valid output 128, delayed sync outputs 132, an input 120, and a circuit 108.

Circuit 108 may include a horizontal-sync counter 110 (which horizontal-sync counter 110 may be referred to herein alternatively as "h-sync counter 110"), a vertical-sync counter 112 (which vertical-sync counter 112 may be referred to herein alternatively as "v-sync counter 112"), a delayed horizontal-sync counter 124 (which delayed horizontal-sync counter 124 may be referred to herein alternatively as "delayed h-sync counter 124"), and a delayed vertical-sync counter 126 (which delayed vertical-sync counter 126 may be referred to herein alternatively as a "delayed v-sync counter 126").

Video-timing generator 102 may provide (e.g., generate, provide, or both, without limitation) a data-valid signal 106 (which data-valid signal 106 may be referred to herein alternatively as "data valid 106"), a horizontal-sync signal 116 (which horizontal-sync signal 116 may be referred to herein alternatively as "h-sync 116"), and a vertical-sync signal 118 (which vertical-sync signal 118 may be referred to herein alternatively as "v-sync 118") to video-data-processing pipeline 138, or more specifically to a video source 140 of video-data-processing pipeline 138. The video source 140 receives the data valid-signal 106, h-sync signal 116, and v-sync signal 118, and synchronizes generation of video data 144 with timing information in the data-valid signal 106.

Video-data-processing pipeline 138 may include video source 140, e.g., at input 152 of video-data-processing pipeline 138, without limitation. Video-data-processing pipeline 138 may, as a non-limiting example, may perform a set of operations on video data 144 to, as a further non-limiting example, change, analyze, or enhance the content of video data 144. In one or more examples, the set of operations performed by video-data-processing pipeline 138 may be for displaying images on a computer monitor, such as those specified by DMT, without limitation. Video-data-processing pipeline 138 may additionally include one or more video processors 146 (which video processors 146 may be referred to herein alternatively as "video processor 146," "video processors 146," and/or "video processor(s) 146"). Video source is operative to provide (e.g., generate, provide, or both, without limitation) video data 144 to a video-data-processing pipeline 138, or more specifically, to video processor(s) 146 of video-data-processing pipeline 138. Video-data-processing pipeline 138 may provide delayed data-valid signal 122 (which delayed data-valid signal 122 may be referred to herein alternatively as "delayed data-valid 122") to video-timing generator 102 (e.g., to input 120 of video-timing generator 102) e.g., from an output 154 of video-data-processing pipeline 138. Video-data-processing pipeline 138 may provide processed video data 148 (which processed video data 148 may be referred to herein alternatively as "video data 148") to display 150.

Video-timing generator 102 may provide a delayed data-valid signal 130 (which delayed data-valid signal 130 may be substantially the same as delayed data-valid signal 122 provided by video-data processing pipeline 138, which delayed data-valid signal 130 may be referred to herein alternatively as "delayed data-valid 130"), delayed horizontal-sync signal 134 and delayed vertical-sync signal 136 to display 150.

Video source 140 may be, or may include a source of video data 144 with regard to system 100. Video source 140 may create, read, or receive video data 144. Video source 140 may be, as non-limiting examples, a video camera, a hard drive including video data 144, a disc including video data 144, and a recipient of a stream of data including video data 144.

Video data 144 may be, or may include, images and/or sound information encoded into a signal in any suitable format including, as non-limiting examples, RGB, YUV, RAW, Motion Picture Experts Group 4 (MPEG 4 or MP4), Windows Media Video (WMV), and Flash Video (FLV).

Video processor(s) 146 may be, or may include, one or more functional blocks that may perform respective operations on video data 144. Non-limiting examples of operations include: translating video data 144 into processed video data 148 (i.e., a format suitable to be reproduced by display 150), image processing, edge-detection, and/or image enhancement.

Video-data-processing pipeline 138 may be implemented in one or more a field-programmable gate arrays (FPGAs) and/or application-specific integrated circuits (ASICs). In some non-limiting examples, each of video source 140 and video processor(s) 146 may be implemented in a respective intellectual property block of an FPGA or an ASIC.

Processed video data 148 may be, or may include, video data 144 encoded into signals for reproduction at display 150. Processed video data 148 may include data blocks (e.g., composed of one or more bytes) for individual pixels of display 150. The data blocks may be ordered in the signal according to rows and screens of display 150. Processed video data 148 may additionally include audio data to be reproduced as sound.

Display 150 may be, or may include, a device or system to display images (e.g., sequentially as video) and/or play sounds. Display 150 may operate according to standards, including, as non-limiting examples, High-Definition Multimedia Interface (HDMI), 4K HDMI, and Video Graphics Array (VGA). In one or more examples, display 150 may be a computer display, computer monitor, or smart-television.

Video-timing generator 102 may provide one or more timing signals (including data-valid signal 106, horizontal-sync signal 116, vertical-sync signal 118, delayed data-valid signal 130, delayed horizontal-sync signal 134 and delayed vertical-sync signal 136) to video-data-processing pipeline 138 and/or display 150 to cause images (and/or audio) displayed (and/or played) at display 150 to display (and/or play) properly. As a non-limiting example, display 150 may translate data blocks (e.g., one or more bytes) of processed video data 148 into images and/or sound. More specifically, display 150 may translate a first number of data blocks of processed video data 148 into a first number of pixels in a first row of display 150 and a second number of data blocks of processed video data 148 into a second number of pixels of a second row of display 150. Display 150 may use delayed horizontal-sync signal 134 to determine where the first number of data blocks of processed video data 148 ends and the second number of data blocks of processed video data 148 begins. In other words, display 150 may parse processed video data 148 into rows according to delayed horizontal-sync signal 134. Additionally, display 150 may begin refreshing the first row of display 150 (e.g., after a last row has been populated) according to delayed vertical-sync signal 136. In other words, display 150 may parse processed video data 148 into screens according to delayed vertical-sync signal 136. Additionally, display 150 may use delayed data-valid signal 130 to determine when to translate processed video data 148 into visual and/or audio information. As a non-limiting example, display 150 may display visual information when delayed data-valid signal 130 is active, e.g., high.

It may be important that delayed horizontal-sync signal 134, and delayed vertical-sync signal 136 are synchronized with processed video data 148. As a non-limiting example, any mismatch between the timing of delayed horizontal-sync signal 134, delayed vertical-sync signal 136, and processed video data 148 may result in processed video data 148 being incorrectly reproduced by display 150. As a non-limiting example, a mismatch between delayed horizontal-sync signal 134, delayed vertical-sync signal 136, and processed video data 148 may result in horizontally or vertically shifted video display or monitor not recognizing the video signals.

In a conventional system, not illustrated by FIG. 1, a conventional video-timing generator generates a data-valid signal, a horizontal-sync signal, and a vertical-sync signal and provides the data-valid signal, the horizontal-sync signal, and the vertical-sync signal to a video source. The video source provides video data and the data-valid signal, the horizontal-sync signal, and the vertical-sync signal to conventional video processors of a video-data-processing pipeline. The conventional video processors may each delay the video data as a result of operations performed on the video data. The conventional video processors may also delay the data-valid signal, the horizontal-sync signal, and the vertical-sync signal by the same duration as the video data is delayed such that the video data may be kept synchronized with the data-valid signal, the horizontal-sync signal, and the vertical-sync signal. To delay the data-valid signal, the horizontal-sync signal, and the vertical-sync signal, conventional video processors (including each video processor in a conventional video-data processing pipeline) include respective logic to delay the data-valid signal, the horizontal-sync signal, and the vertical-sync signal.

Various examples include a video-timing generator (e.g., video-timing generator 102) that generates a delayed horizontal-sync signal (e.g., delayed horizontal-sync signal 134) and a delayed vertical-sync signal (e.g., delayed vertical-sync signal 136). In such examples, the video-timing generator may provide the delayed horizontal-sync signal and the delayed vertical-sync signal to a display (e.g., display 150). By generating the delayed horizontal-sync signal and the delayed vertical-sync signal, and providing the delayed horizontal-sync signal and the delayed vertical-sync signal to the display, the video-timing generator obviates the need for video processors (e.g., video processor(s) 146) to delay the horizontal-sync signal and the vertical-sync signal. Without the need to delay the horizontal-sync signal and the vertical-sync signal, the video processors may not be required to include logic to delay the horizontal-sync signal and the vertical-sync signal. Thus, a system that includes a video-timing generator that generates a delayed horizontal-sync signal and a delayed vertical-sync signal and provides the delayed horizontal-sync signal and the delayed vertical-sync signal to a display may include simpler and/or less expensive video processors.

Thus, in some non-limiting examples, video source 140 may not provide horizontal-sync signal 116 and vertical-sync signal 118 to video processor(s) 146 of video-data-processing pipeline 138. Thus, video processor(s) 146 of video-data-processing pipeline 138 may not receive any of horizontal-sync signal 116, vertical-sync signal 118, delayed horizontal-sync signal 134 and delayed vertical-sync signal 136. Further, video processor(s) 146 of video-data-processing pipeline 138 may not include a circuit to handle any of horizontal-sync signal 116, vertical-sync signal 118, delayed horizontal-sync signal 134 and delayed vertical-sync signal 136.

In some non-limiting examples, video-timing generator 102 may be implemented in an FPGA or an ASIC. In some non-limiting examples, video-timing generator 102 may be implemented in the same FPGA or ASIC as one or more of video source 140 and video processor(s) 146. In other non-limiting examples, video-timing generator 102 may be implemented by any suitable device.

As an example of contemplated operations of system 100, video-timing generator 102 may generate data-valid signal 106, horizontal-sync signal 116, and vertical-sync signal 118. Data-valid signal 106 may indicate a timing for a start of video data.

Horizontal-sync signal 116 may indicate a timing for a start of a new horizontal line of data in the video data. Horizontal-sync counter 110 may count clock cycles since video-timing generator 102 began outputting data-valid signal 106. Video-timing generator 102 may generate horizontal-sync signal 116 when horizontal-sync counter 110 has counted a number of clock cycles corresponding to a timing of starting a new horizontal line.

Vertical-sync signal 118 may indicate a timing for a start of a new screen of data in the video data (i.e., returning to a top horizontal line to begin refreshing the screen). Vertical-sync counter 112 may count clock cycles since video-timing generator 102 began outputting data-valid signal 106. Video-timing generator 102 may generate vertical-sync signal 118 when vertical-sync counter 112 has counted a number of clock cycles corresponding to a timing of starting a new screen.

Video-timing generator 102 may provide data-valid signal 106 to video-data-processing pipeline 138 (or more specifically to video source 140, which video source 140 may be located at input 152 of video-data-processing pipeline 138) at output 104. Video-timing generator 102 may provide horizontal-sync signal 116 and vertical-sync signal 118 to video-data-processing pipeline 138 (or more specifically to video source 140, which video source 140 may be located at input 152 of video-data-processing pipeline 138), at sync outputs 114.

After receiving data-valid signal 106, video source 140 may provide video data 144 and data-valid signal 142 to video-data-processing pipeline 138, e.g., to video processor(s) 146 of video-data-processing pipeline 138. Data-valid signal 142 indicates when valid pixel data (here, processed video data 148) is provided (e.g., transmitted, without limitation) to display 150. In one or more examples, processed video data 148 may be provided at a timing and rate indicated, at least in part, by data-valid signal 106. So, in some examples, data-valid signal 142 may be the same (e.g., indicate the same timing, without limitation) as data-valid signal 106. Additionally or alternatively, data-valid signal 142 may be a delayed version of data-valid signal 106 as delayed by video source 140 (e.g., corresponding to delay of video source 140, without limitation). Video source 140 may delay data-valid signal 106 according to operations of video source 140, i.e., such that video data 144 is valid when data-valid signal 142 arrives at video processor(s) 146, or in other words, video data 144 and data-valid signal 142 are synchronized.

Video processor(s) 146 may process video data 144 according to the individual operations of each of video processor(s) 146 to generate processed video data 148. Example operations of video processor(s) 146 include translating video data 144 into processed video data 148, image processing, edge-detection, and/or image enhancement.

Additionally, video processor(s) 146 may delay data-valid signal 142 by a duration related to processing video data 144. In particular, video processor(s) 146 may delay data-valid signal 142 according to the individual operations of each of video processor(s) 146 to generate delayed data-valid signal 122 such that delayed data-valid signal 122 is synchronized with processed video data 148. As a non-limiting example, if an operation of a first one of video processor(s) 146 takes one millisecond (ms) to perform on video data 144, the first one of video processor(s) 146 may delay data-valid signal 142 by one ms. Additionally, if a second one of video processor(s) 146 takes two ms to perform on video data 144, the second one of video processor(s) 146 may delay data-valid signal 142 by an additional two ms. Video-data-processing pipeline 138 may provide delayed data-valid signal 122 from output 154 to video-timing generator 102.

Video processor(s) 146 may, or may not, receive horizontal-sync signal 116 and/or vertical-sync signal 118 from video source 140. Video processor(s) 146 may, or may not, include inputs for receiving horizontal-sync signal 116 and/or vertical-sync signal 118. Video processor(s) 146 may, or may not, include logic to process or delay horizontal-sync signal 116 and/or vertical-sync signal 118.

Video-timing generator 102 may receive delayed data-valid signal 122 at input 120. At least partially responsive to the received delayed data-valid signal 122, video-timing generator 102 may initialize delayed horizontal-sync counter 124 and delayed vertical-sync counter 126.

Video-timing generator 102 may generate delayed horizontal-sync signal 134 at least partially responsive to delayed horizontal-sync counter 124. As a non-limiting example, delayed horizontal-sync counter 124 may count clock cycles since video-timing generator 102 received delayed data-valid signal 122. Video-timing generator 102 may generate delayed horizontal-sync signal 134 when delayed horizontal-sync counter 124 has counted a number of clock cycles corresponding to a timing of starting a new horizontal line. Delayed horizontal-sync signal 134 may be substantially the same as horizontal-sync signal 116, however, delayed horizontal-sync signal 134 may be delayed by the duration of time that it took video-data-processing pipeline 138 (including video source 140 and video processor(s) 146) to generate processed video data 148, e.g., from video data 144. Thus, delayed horizontal-sync signal 134 may be synchronized with processed video data 148. There is no requirement that delayed horizontal-sync signal 134 be delayed by precisely the duration of time that it took video-data-processing pipeline 138 (including video source 140 and video processor(s) 146) to generate processed video data 148, as long as they are sufficiently synchronized for proper operation of display 150.

Similarly video-timing generator 102 may generate delayed vertical-sync signal 136 at least partially responsive to delayed vertical-sync counter 126. Video-timing generator 102 may generate delayed vertical-sync signal 136 when delayed vertical-sync counter 126 has counted a number of clock cycles corresponding to a timing of starting a new screen. Delayed vertical-sync signal 136 may be substantially the same as vertical-sync signal 118, however, delayed vertical-sync signal 136 may be delayed by the duration of time that it took video-data-processing pipeline 138 to generate processed video data 148, e.g., from video data 144. Thus, delayed vertical-sync signal 136 may be synchronized with processed video data 148. There is no requirement that delayed vertical-sync signal 136 be delayed by precisely the duration of time that it took video-data-processing pipeline 138 (including video source 140 and video processor(s) 146) to generate processed video data 148, as long as they are sufficiently synchronized for proper operation of display 150.

Video-timing generator 102 may provide delayed horizontal-sync signal 134 and delayed vertical-sync signal 136 to display 150 at respective ones of delayed sync outputs 132. Additionally, video-timing generator 102 may provide delayed data-valid signal 130 (which delayed data-valid signal 130 may be the same as delayed data-valid signal 122) to display 150 at delayed data-valid output 128. In another example, delayed data-valid signal 122 may be provided to display 150 by video-data-processing pipeline 138, e.g., from output 154, and delayed data-valid signal 130 may not be required.

Figure 2:
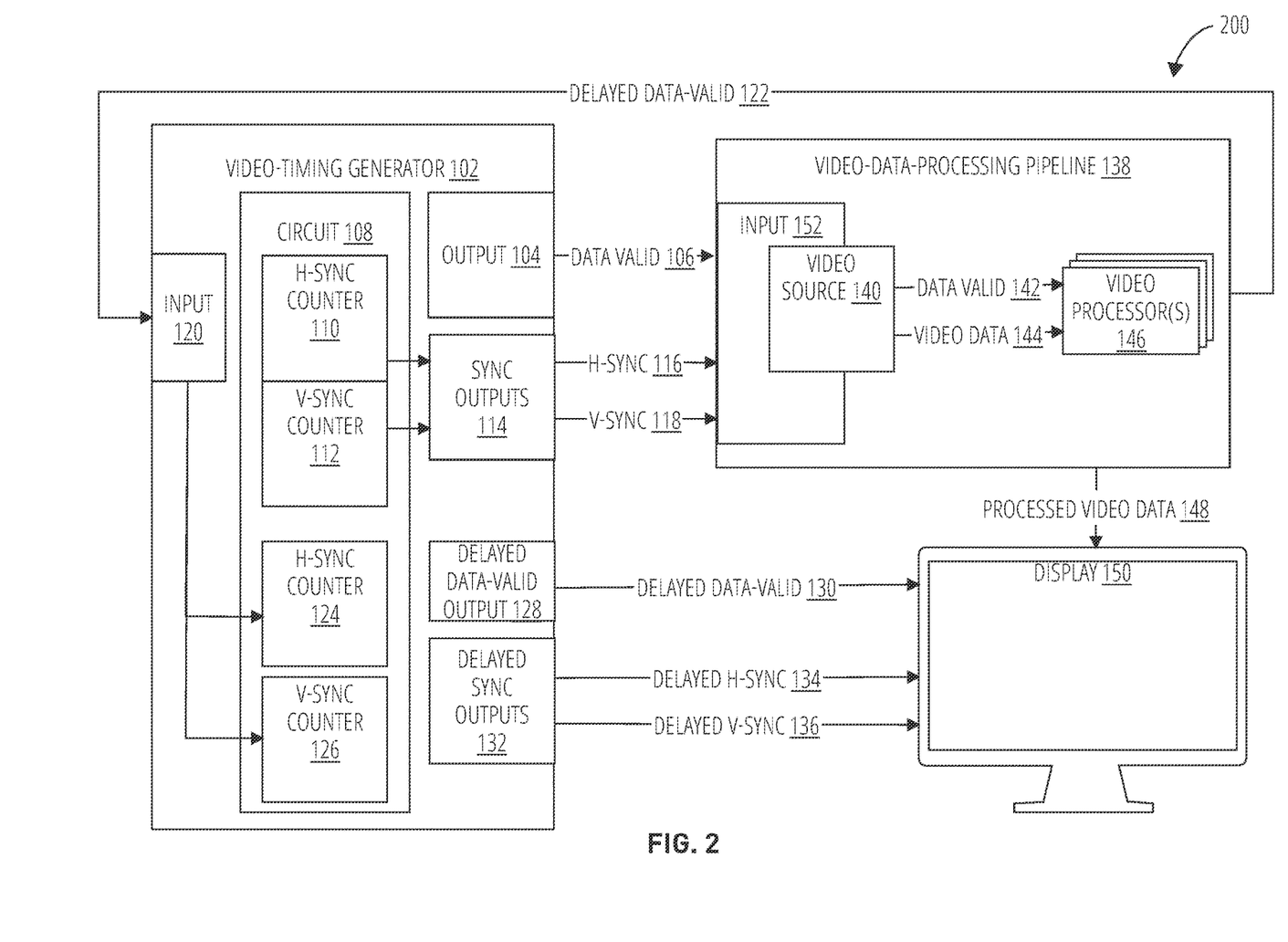
FIG. 2 is a functional block diagram depicting another system according to one or more examples.

FIG. 2 is a functional block diagram depicting a system 200 according to one or more examples. System 200 includes a video-timing generator 102, a video-data-processing pipeline 138, and a video source 140 at an input 152 of video-data-processing pipeline 138.

Video-timing generators 102 may generate data-valid signal 106 and provide data-valid signal 106 to video source 140. Video source 140 may provide video data 144 to video-data-processing pipeline 138 and provide data-valid signal 142 to video-data-processing pipeline 138. Video-data-processing pipeline 138 may process video data 144, provide processed video data 148 to a display 150, delay data-valid signal 142, and provide delayed data-valid signal 122 to video-timing generator 102. Video-timing generator 102 may generate delayed horizontal-sync signal 134 and delayed vertical-sync signal 136 at least partially responsive to delayed data-valid signal 122 and provide delayed horizontal-sync signal 134 delayed vertical-sync signal 136 to the display 150.

Figure 3:
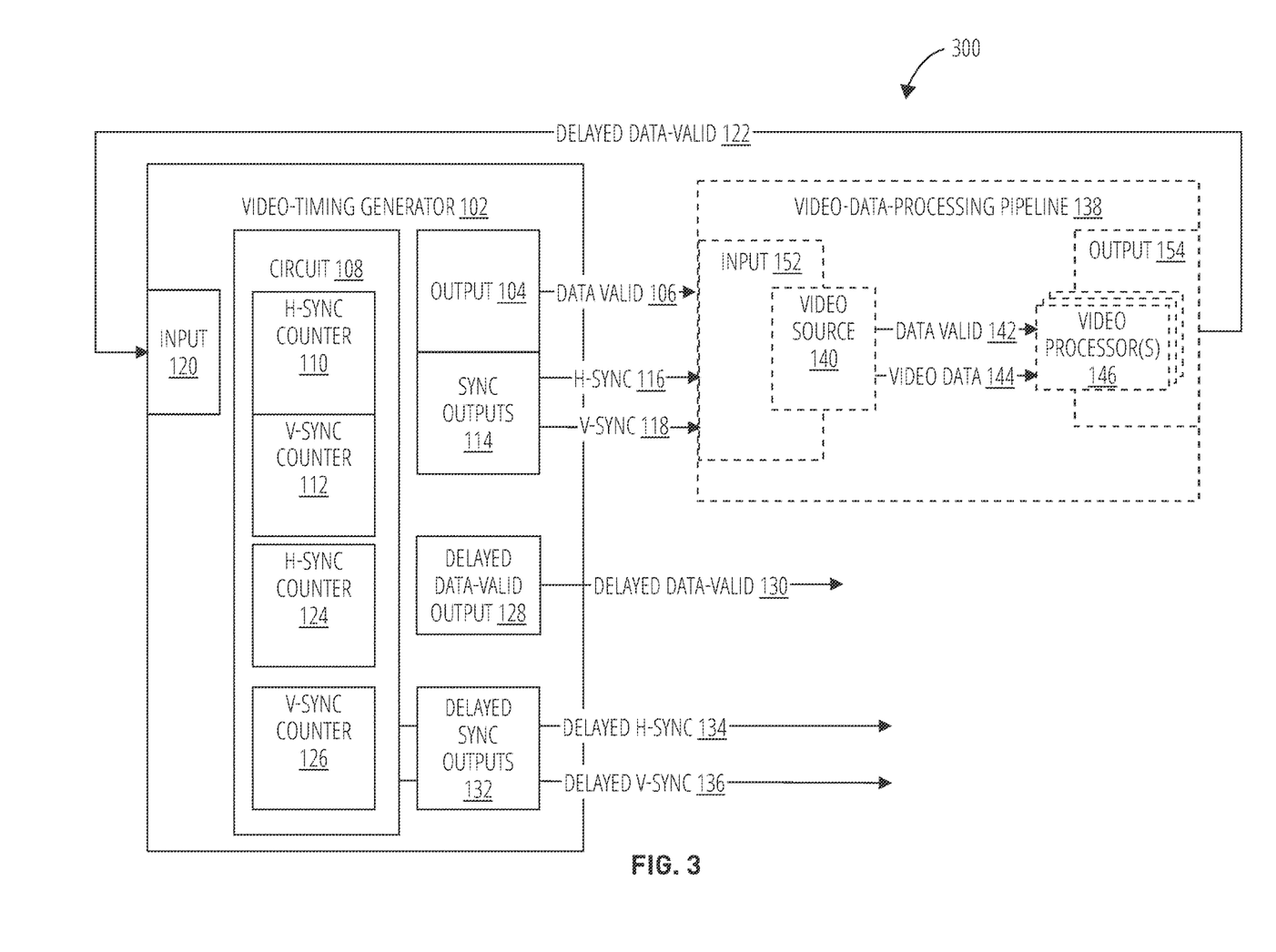
FIG. 3 is a functional block diagram depicting an apparatus according to one or more examples.

FIG. 3 is a functional block diagram depicting an apparatus 300 according to one or more examples. Apparatus 300 may include an output 104 to provide a data-valid signal 106 to a video source 140. The video source 140 provides video data 144 to a video-data-processing pipeline 138. Apparatus 300 may include input 120 to receive a delayed data-valid signal 122 from video-data-processing pipeline 138. Apparatus 300 may include circuit 108 to generate a delayed horizontal-sync signal 134 and a delayed vertical-sync signal 136 at least partially responsive to received delayed data-valid signal 122 (e.g., according to a timing of delayed data-valid signal 122, without limitation).

In one or more examples, respective ones of video-data-processing pipeline 138, video source 140, input 152, and output 154 are optional as indicated by video-data-processing pipeline 138, video source 140, input 152, and output 154 being illustrated by FIG. 3 using dashed lines. In examples where apparatus 300 does not include video-data-processing pipeline 138, apparatus 300 may be understood to be a video-timing generator 102.

Figure 4:
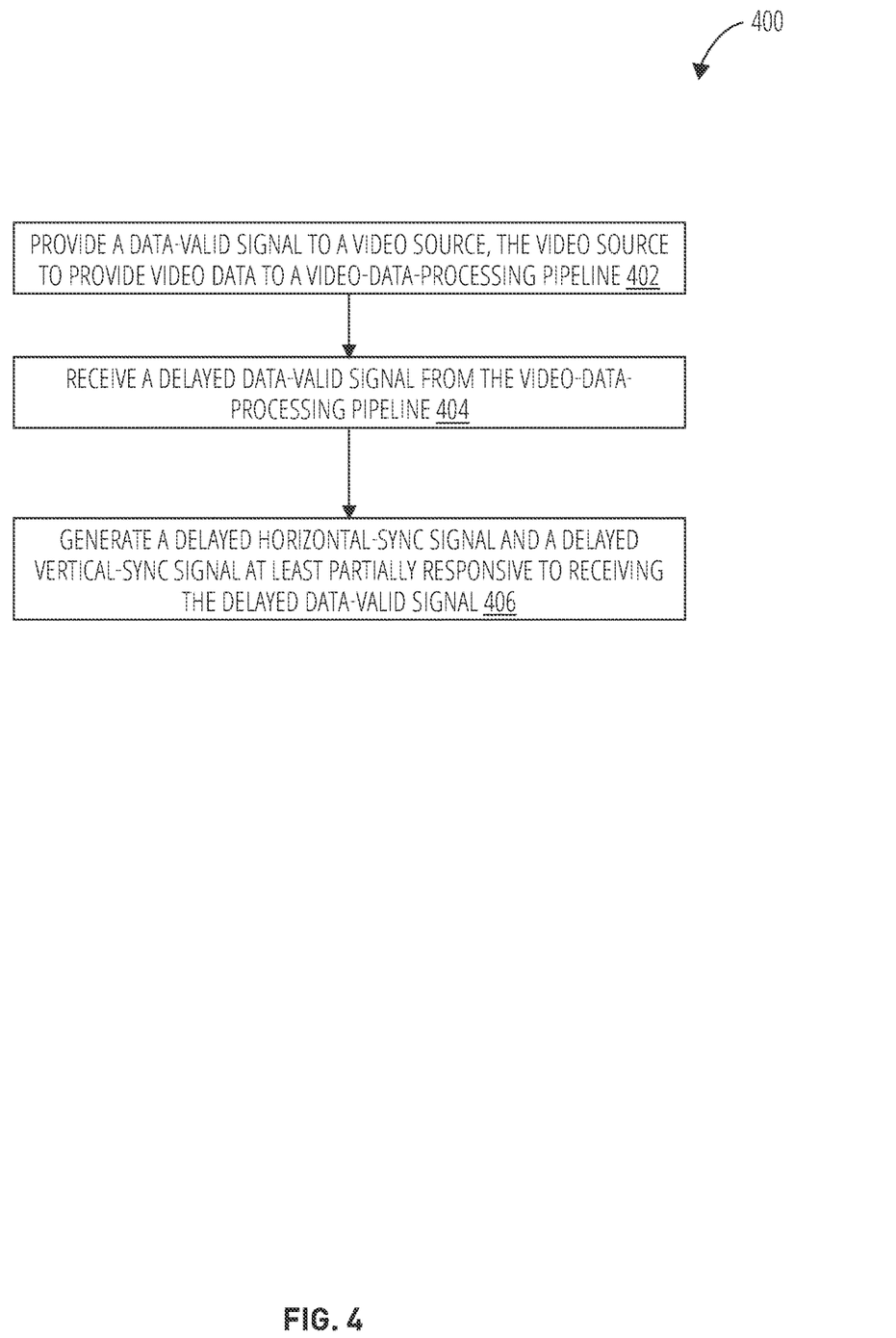
FIG. 4 is a flowchart of a method, according to one or more examples.

FIG. 4 is a flowchart of a process 400, according to one or more examples. One or more operations of process 400 may be performed by a device or system, such as system 100 of FIG. 1, video-timing generator 102 of FIG. 1 and/or FIG. 2, video-data-processing pipeline 138 of FIG. 1 and/or FIG. 2, apparatus 300 of FIG. 3, without limitation. Although illustrated as discrete blocks, various blocks may be divided into additional blocks, combined into fewer blocks, or eliminated, depending on the desired implementation.

At operation 402, process 400 provides a data-valid signal to a video source to align the timing of video data provided by the video source with the timing of a display controller. The video source may provide video data to a video-data-processing pipeline. As a non-limiting example, data-valid signal 106 of FIG. 1, FIG. 2, and/or FIG. 3 may be provided to video source 140 of FIG. 1, FIG. 2, and/or FIG. 3.

At operation 404, process 400 receives a delayed data-valid signal from the video-data-processing pipeline. As a non-limiting example, delayed data-valid signal 122 of FIG. 1, FIG. 2, and/or FIG. 3 may be received from video-data-processing pipeline 138.

At operation 406, process 400 generates a delayed horizontal-sync signal and a delayed vertical-sync signal at least partially responsive to the received delayed data-valid signal (e.g., responsive to a timing indicated by delayed data-valid signal, without limitation). As a non-limiting example, delayed horizontal-sync signal 134 of FIG. 1, FIG. 2, and/or FIG. 3 and delayed vertical-sync signal 136 of FIG. 1, FIG. 2, and/or FIG. 3 may be generated at least partially responsive to the received delayed data-valid signal 122 of FIG. 1, FIG. 2, and/or FIG. 3.

Figure 5:
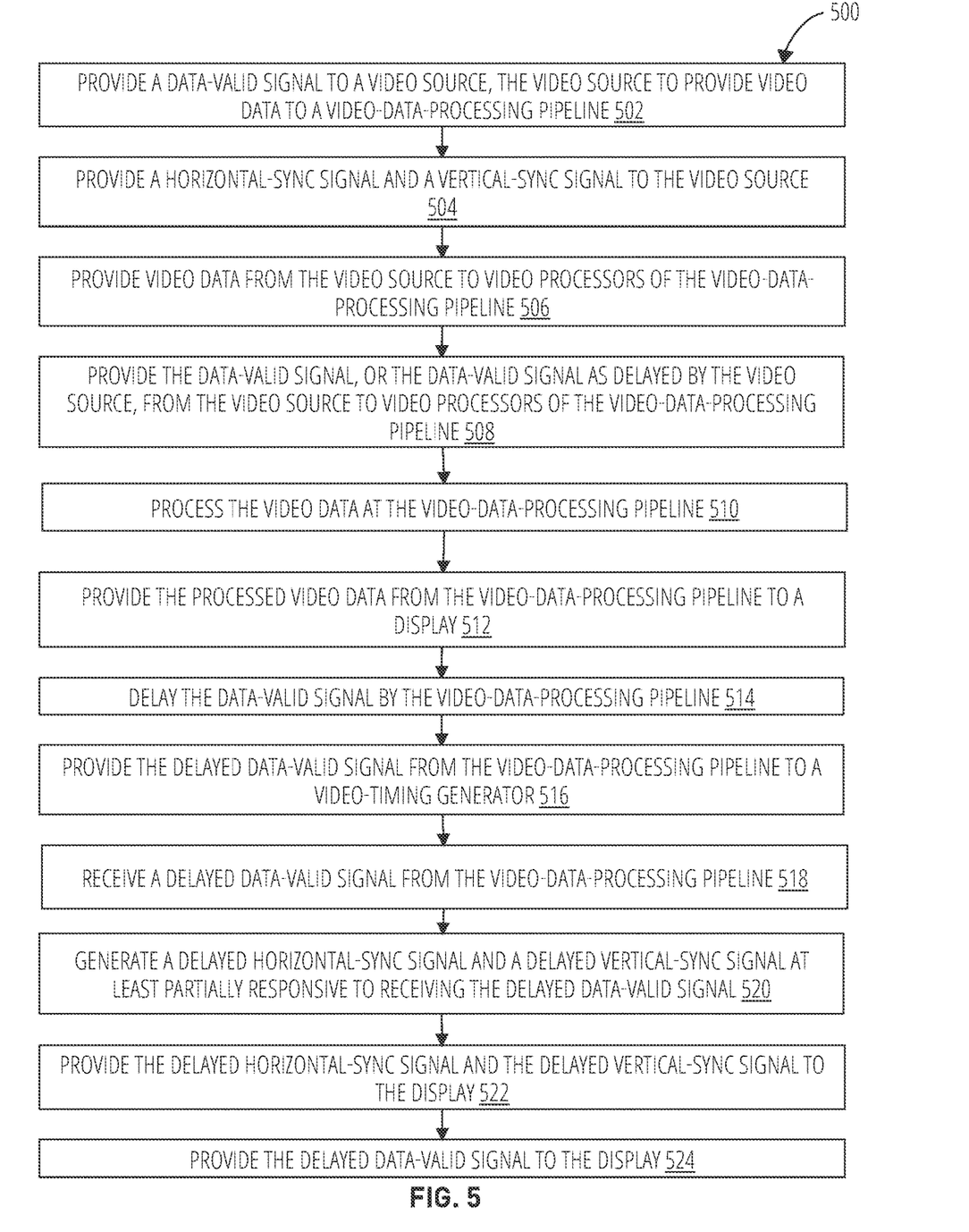
FIG. 5 is a flowchart of another method, according to one or more examples.

FIG. 5 is a flowchart of a process 500, according to one or more examples. At least a portion of process 500 may be performed, in some examples, by a device or system, such as system 100 of FIG. 1, video-timing generator 102 of FIG. 1 and/or FIG. 2, video-data-processing pipeline 138 of FIG. 1 and/or FIG. 2, apparatus 300 of FIG. 3 or another device or system. Although illustrated as discrete blocks, various blocks may be divided into additional blocks, combined into fewer blocks, or eliminated, depending on the desired implementation.

At operation 502, process 500 provides a data-valid signal to a video source. The video source may provide video data to a video-data-processing pipeline. As a non-limiting example, data-valid signal 106 of FIG. 1, FIG. 2, and/or FIG. 3 may be provided to video source 140 of FIG. 1, FIG. 2, and/or FIG. 3.

At operation 504, process 500 provides a horizontal-sync signal and a vertical-sync signal to the video source. As a non-limiting example, horizontal-sync signal 116 of FIG. 1 and/or FIG. 2 and vertical-sync signal 118 of FIG. 1 and/or FIG. 2 may be provided to video source 140.

At operation 506, process 500 provides video data from the video source to the video-data-processing pipeline. As a non-limiting example, video data 144 of FIG. 1 and/or FIG. 2 may be provided to video-data-processing pipeline 138.

At operation 508, process 500 provides the data-valid signal, or the data-valid signal as delayed by the video source, from the video source to the video-data-processing pipeline. As a non-limiting example, data-valid signal 142 of FIG. 1 and/or FIG. 2 may be provided from video source 140 to video-data-processing pipeline 138 (or more specifically to video processor(s) 146 of FIG. 1 and/or FIG. 2 of video-data-processing pipeline 138).

At operation 510, process 500 processes the video data at the video-data-processing pipeline. As a non-limiting example, video data 144 may be processed at video-data-processing pipeline 138 (or more specifically at video processor(s) 146 of video-data-processing pipeline 138).

At operation 512, process 500 provides the processed video data from the video-data-processing pipeline to a display. As a non-limiting example, processed video data 148 of FIG. 1 and/or FIG. 2 may be provided from video-data-processing pipeline 138 to display 150 of FIG. 1 and/or FIG. 2.

At operation 514, process 500 delays the data-valid signal (e.g., generates a version of the data-valid signal that has delayed timing compared to the data-valid signal, without limitation) by the video-data-processing pipeline. As a non-limiting example, data-valid signal 142 may be delayed by video-data-processing pipeline 138 (or more specifically, delayed at video processor(s) 146 of video-data-processing pipeline 138).

At operation 516, process 500 provides the delayed data-valid signal from the video-data-processing pipeline to a video-timing generator. As a non-limiting example, delayed data-valid signal 122 of FIG. 1, FIG. 2, and/or FIG. 3 may be provided from video-data-processing pipeline 138 to video-timing generator 102 of FIG. 1 and/or FIG. 2 or to apparatus 300 of FIG. 3.

At operation 518, process 500 receives a delayed data-valid signal from the video-data-processing pipeline. As a non-limiting example, delayed data-valid signal 122 may be received from video-data-processing pipeline 138, e.g., at input 120 of video-timing generator 102.

At operation 520, process 500 generates a delayed horizontal-sync signal and a delayed vertical-sync signal at least partially responsive to the received delayed data-valid signal. As a non-limiting example, delayed horizontal-sync signal 134 of FIG. 1, FIG. 2, and/or FIG. 3 and delayed vertical-sync signal 136 of FIG. 1, FIG. 2, and/or FIG. 3 may be generated at least partially responsive to the received delayed data-valid signal 122.

At operation 522, process 500 provides the delayed horizontal-sync signal and the delayed vertical-sync signal to the display. As a non-limiting example, delayed horizontal-sync signal 134 and delayed vertical-sync signal 136 may be provided to display 150.

At operation 524, process 500 provides the delayed data-valid signal to the display. As a non-limiting example, delayed data-valid signal 130 of FIG. 1 and/or FIG. 2 may be provided to display 150.

Modifications, additions, or omissions may be made to process 400 and/or process 500 without departing from the scope of the present disclosure. For example, the operations of process 400 and/or process 500 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 6:
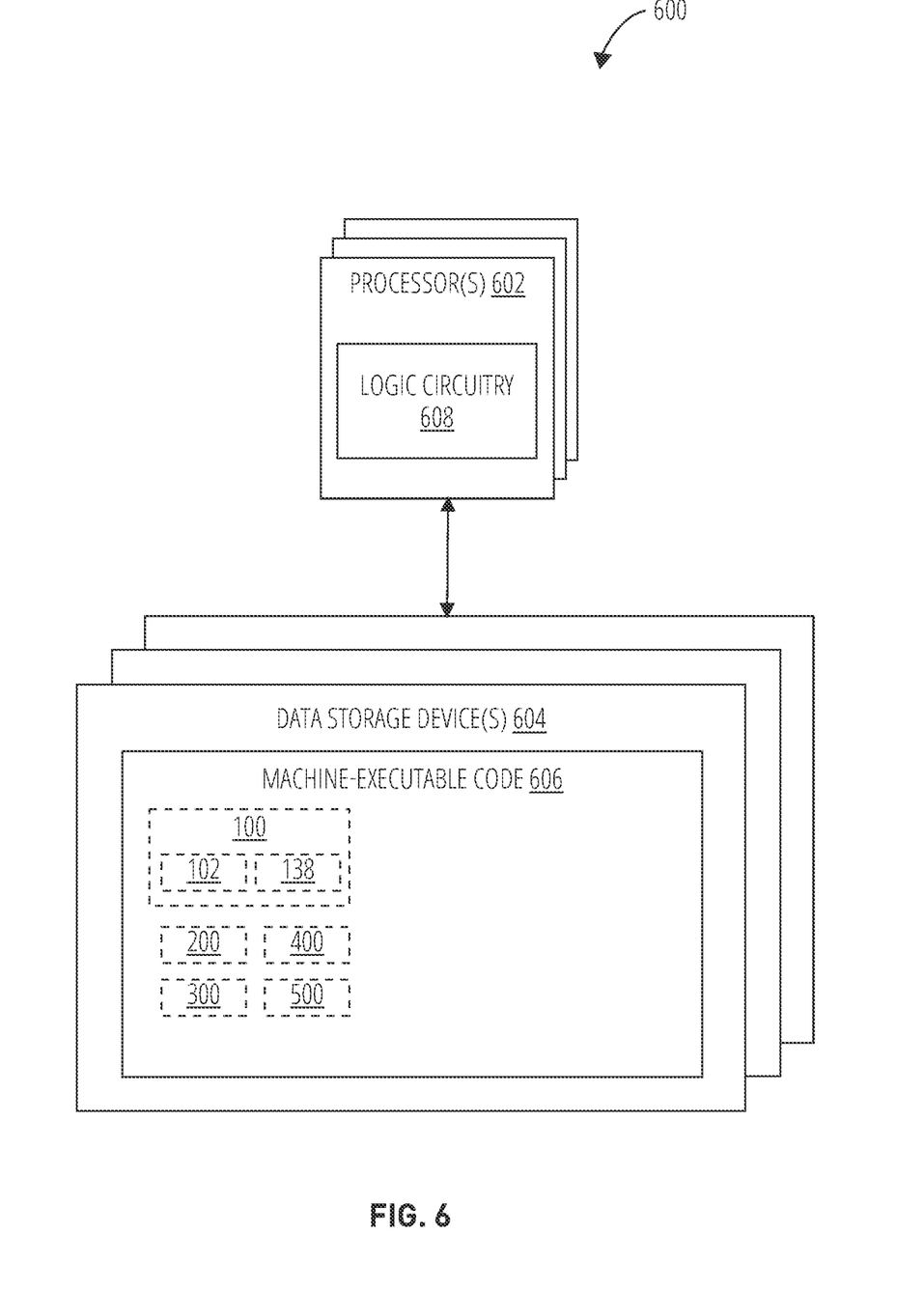
FIG. 6 illustrates a block diagram of a device that may be used to implement various functions, operations, acts, processes, or methods, in accordance with one or more examples.

FIG. 6 is a block diagram of a device 600 that, in one or more examples, may be used to implement various functions, operations, acts, processes, or methods disclosed herein. Device 600 includes one or more processors 602 (sometimes referred to herein as "processors 602") operably coupled to one or more apparatuses such as data storage devices (sometimes referred to herein as "storage 604"), without limitation. Storage 604 includes machine executable code 606 stored thereon (e.g., stored on a computer-readable memory, without limitation) and processors 602 include logic circuitry 608. Machine executable code 606 include information describing functional elements that may be implemented by (e.g., performed by) logic circuitry 608. Logic circuitry 608 implements (e.g., performs) the functional elements described by machine executable code 606. Device 600, when executing the functional elements described by machine executable code 606, should be considered as special purpose hardware may carry out the functional elements disclosed herein. In one or more examples, processors 602 may perform the functional elements described by machine executable code 606 sequentially, concurrently (e.g., on one or more different hardware platforms), or in one or more parallel process streams.

When implemented by logic circuitry 608 of processors 602, machine executable code 606 may adapt processors 602 to perform operations of examples disclosed herein. For example, machine executable code 606 may adapt processors 602 to perform at least a portion or a totality of process 400 of FIG. 4 and/or process 500 of FIG. 5. As another example, machine executable code 606 may adapt processors 602 to perform at least a portion or a totality of the operations discussed for video-timing generator 102 of FIG. 1 and/or FIG. 2, video-data-processing pipeline 138 of FIG. 1, FIG. 2, and/or FIG. 3, and/or apparatus 300 of FIG. 3 without limitation.

Processors 602 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 602 may include any conventional processor, controller, microcontroller, or state machine. Processors 602 may also be implemented as a combination of computing devices, such as a combination of a DSP and a microprocessor, a plurality of microprocessors, one or more microprocessors in conjunction with a DSP core, or any other such configuration.

In one or more examples, storage 604 includes volatile data storage (e.g., random-access memory (RAM), without limitation), non-volatile data storage (e.g., Flash memory, a hard disc drive, a solid state drive, erasable programmable read-only memory (EPROM), without limitation). In one or more examples processors 602 and storage 604 may be implemented into a single device (e.g., a semiconductor device product, a system on chip (SOC), without limitation). In one or more examples processors 602 and storage 604 may be implemented into separate devices.

In one or more examples, machine executable code 606 may include computer-readable instructions (e.g., software code, firmware code, without limitation). By way of non-limiting example, the computer-readable instructions may be stored by storage 604, accessed directly by processors 602, and executed by processors 602 using at least logic circuitry 608. Also by way of non-limiting example, the computer-readable instructions may be stored on storage 604, transmitted to a memory device (not shown) for execution, and executed by processors 602 using at least logic circuitry 608. Accordingly, in one or more examples logic circuitry 608 includes electrically configurable logic circuitry.

In one or more examples, machine executable code 606 may describe hardware (e.g., circuitry, without limitation) to be implemented in logic circuitry 608 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples machine executable code 606 may include an HDL, an RTL, a GL description, a mask level description, other hardware description, or any combination thereof.

In examples where machine executable code 606 includes a hardware description (at any level of abstraction), a system (not shown, but including storage 604) may implement the hardware description described by machine executable code 606. By way of non-limiting example, processors 602 may include a programmable logic device (e.g., an FPGA or a PLC, without limitation) and the logic circuitry 608 may be electrically controlled to implement circuitry corresponding to the hardware description into logic circuitry 608. Also by way of non-limiting example, logic circuitry 608 may include hard-wired logic manufactured by a manufacturing system (not shown, but including storage 604) according to the hardware description of machine executable code 606.

Regardless of whether machine executable code 606 includes computer-readable instructions or a hardware description, logic circuitry 608 performs the functional elements described by machine executable code 606 when implementing the functional elements of machine executable code 606. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" means "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus, comprising: an output to provide a data-valid signal to a video source operative to provide video data to a video-data-processing pipeline; an input to receive a delayed data-valid signal from the video-data-processing pipeline; and a circuit to generate a delayed horizontal-sync signal and a delayed vertical-sync signal at least partially responsive to the received delayed data-valid signal.

Example 2: The apparatus according to Example 1, comprising delayed-sync outputs to provide the delayed horizontal-sync signal and the delayed vertical-sync signal respectively to a display.

Example 3: The apparatus according to any of Examples 1 and 2, comprising a delayed data-valid output to provide the delayed data-valid signal to a display.

Example 4: The apparatus according to any of Examples 1 through 3, wherein the circuit comprises a delayed horizontal-sync counter and a delayed vertical-sync counter, the circuit to initialize the delayed horizontal-sync counter and the delayed vertical-sync counter at least partially responsive to the received the delayed data-valid signal, the circuit to generate the delayed horizontal-sync signal at least partially responsive to the delayed horizontal-sync counter, and the circuit to generate the delayed vertical-sync signal at least partially responsive to the delayed vertical-sync counter.

Example 5: The apparatus according to any of Examples 1 through 4, comprising sync outputs to provide a horizontal-sync signal and a vertical-sync signal, respectively, to the video source.

Example 6: The apparatus according to any of Examples 1 through 5, wherein the circuit comprises a horizontal-sync counter and a vertical-sync counter, wherein the circuit to generate a horizontal-sync signal at least partially responsive to the horizontal-sync counter, wherein the circuit to generate a vertical-sync signal at least partially responsive to the vertical-sync counter, wherein the apparatus further comprises sync outputs to provide the horizontal-sync signal and the vertical-sync signal, respectively, to the video source.

Example 7: The apparatus according to any of Examples 1 through 6, wherein the output comprises a data-valid output, wherein the circuit comprises: a delayed horizontal-sync counter to count clock cycles, the circuit to generate the delayed horizontal-sync signal at least partially responsive to counted clock cycles of the delayed horizontal-sync counter, the delayed horizontal-sync counter to initialize at least partially responsive to the received delayed data-valid signal; and a delayed vertical-sync counter to count clock cycles, the circuit to generate the delayed vertical-sync signal at least partially responsive to counted clock cycles of the delayed vertical-sync counter, the delayed vertical-sync counter to initialize at least partially responsive to the received delayed data-valid signal, and wherein the apparatus comprises: a delayed sync outputs to provide the delayed horizontal-sync signal and the delayed vertical-sync signal to a display; and a delayed sync output to provide the delayed data-valid signal to the display.

Example 8: The apparatus according to any of Examples 1 through 7, wherein the circuit comprises: a horizontal-sync counter to count clock cycles, the circuit to generate a horizontal-sync signal at least partially responsive to counted clock cycles of the horizontal-sync counter; and a vertical-sync counter to count clock cycles, the circuit to generate a vertical-sync signal at least partially responsive to counted clock cycles of the vertical-sync counter, and wherein the apparatus comprises: a sync outputs to provide the horizontal-sync signal and the vertical-sync signal to the video source.

Example 9: A system comprising: a video-timing generator; a video-data-processing pipeline; and a video source; the video-timing generator to: generate a data-valid signal; and provide the data-valid signal to the video source; the video source to: provide video data to the video-data-processing pipeline; and provide the data-valid signal, or the data-valid signal as delayed by the video source, to the video-data-processing pipeline; the video-data-processing pipeline to: process the video data; provide the processed video data to a display; delay the data-valid signal provided by the video source; and provide the delayed data-valid signal to the video-timing generator; the video-timing generator to: generate a delayed horizontal-sync signal and a delayed vertical-sync signal at least partially responsive to the delayed data-valid signal; and provide the delayed horizontal-sync signal, the delayed vertical-sync signal, and the delayed data-valid signal to the display.

Example 10: The system according to Example 9, wherein the video-timing generator to provide the delayed data-valid signal to the display.

Example 11: The system according to any of Examples 9 and 10, wherein the video-timing generator to generate a horizontal-sync signal and a vertical-sync signal and to provide the horizontal-sync signal and the vertical sync signal respectively to the video source.

Example 12: The system according to any of Examples 9 through 11, wherein the video source to not provide the horizontal-sync signal and the vertical sync signal respectively to video processors of the video-data-processing pipeline.

Example 13: The system according to any of Examples 9 through 12, wherein video processors of the video-data-processing pipeline to not receive any of the horizontal-sync signal, the vertical-sync signal, the delayed horizontal-sync signal and the delayed vertical-sync signal.

Example 14: The system according to any of Examples 9 through 13, wherein video processors of the video-data-processing pipeline to not include a circuit to handle any of the horizontal-sync signal, the vertical-sync signal, the delayed horizontal-sync signal and the delayed vertical-sync signal.

Example 15: The system according to any of Examples 9 through 14, wherein the video-data-processing pipeline to delay the data-valid signal by a duration related to the processing of the video data.

Example 16: A method comprising: providing a data-valid signal to a video source, the video source to provide video data to a video-data-processing pipeline; receiving a delayed data-valid signal from the video-data-processing pipeline; and generating a delayed horizontal-sync signal and a delayed vertical-sync signal at least partially responsive to receiving the delayed data-valid signal.

Example 17: The method according to Example 16, comprising providing the delayed horizontal-sync signal and the delayed vertical-sync signal to a display.

Example 18: The method according to any of Examples 16 and 17, comprising providing the delayed data-valid signal to a display.

Example 19: The method according to any of Examples 16 through 18, comprising: providing a horizontal-sync signal and a vertical-sync signal to the video source.

Example 20: The method according to any of Examples 16 through 19, comprising: providing video data from the video source to video processors of the video-data-processing pipeline; and providing the data-valid signal, or the data-valid signal as delayed by the video source, from the video source to video processors of the video-data-processing pipeline.

Example 21: The method according to any of Examples 16 through 20, comprising: processing the video data at the video-data-processing pipeline; providing the processed video data from the video-data-processing pipeline to a display; delaying the data-valid signal by the video-data-processing pipeline; and providing the delayed data-valid signal from the video-data-processing pipeline to a video-timing generator, the video-timing generator generating the delayed horizontal-sync signal and the delayed vertical-sync signal.

While the present disclosure has been with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   an output to provide a data-valid signal to a video source operative to provide video data to a video-data-processing pipeline;
   an input to receive a delayed data-valid signal from the video-data-processing pipeline, the delayed data-valid signal a replica of the data-valid signal delayed by latency of the video-data-processing pipeline; and
   a circuit to generate a delayed horizontal-sync signal and a delayed vertical-sync signal at least partially responsive to the received delayed data-valid signal.

2. The apparatus of claim 1, comprising delayed-sync outputs to provide the delayed horizontal-sync signal and the delayed vertical-sync signal respectively to a display.

3. The apparatus of claim 1, comprising a delayed data-valid output to provide the delayed data-valid signal to a display.

4. The apparatus of claim 1,
   wherein the circuit comprises a delayed horizontal-sync counter and a delayed vertical-sync counter,
   the circuit to initialize the delayed horizontal-sync counter and the delayed vertical-sync counter at least partially responsive to the received the delayed data-valid signal,
   the circuit to generate the delayed horizontal-sync signal at least partially responsive to the delayed horizontal-sync counter, and
   the circuit to generate the delayed vertical-sync signal at least partially responsive to the delayed vertical-sync counter.

5. The apparatus of claim 1, comprising sync outputs to provide a horizontal-sync signal and a vertical-sync signal, respectively, to the video source.

6. The apparatus of claim 1,
   wherein the circuit comprises a horizontal-sync counter and a vertical-sync counter,
   wherein the circuit to generate a horizontal-sync signal at least partially responsive to the horizontal-sync counter,
   wherein the circuit to generate a vertical-sync signal at least partially responsive to the vertical-sync counter,
   wherein the apparatus further comprises sync outputs to provide the horizontal-sync signal and the vertical-sync signal, respectively, to the video source.

7. The apparatus of claim 1, wherein the output comprises a data-valid output,
   wherein the circuit comprises:
      a delayed horizontal-sync counter to count clock cycles, the circuit to generate the delayed horizontal-sync signal at least partially responsive to counted clock cycles of the delayed horizontal-sync counter, the delayed horizontal-sync counter to initialize at least partially responsive to the received delayed data-valid signal; and
      a delayed vertical-sync counter to count clock cycles, the circuit to generate the delayed vertical-sync signal at least partially responsive to counted clock cycles of the delayed vertical-sync counter, the delayed vertical-sync counter to initialize at least partially responsive to the received delayed data-valid signal, and
   wherein the apparatus comprises:
      a delayed sync outputs to provide the delayed horizontal-sync signal and the delayed vertical-sync signal to a display; and
      a delayed sync output to provide the delayed data-valid signal to the display.

8. The apparatus of claim 7, wherein the circuit comprises:
   a horizontal-sync counter to count clock cycles, the circuit to generate a horizontal-sync signal at least partially responsive to counted clock cycles of the horizontal-sync counter; and
   a vertical-sync counter to count clock cycles, the circuit to generate a vertical-sync signal at least partially responsive to counted clock cycles of the vertical-sync counter, and
   wherein the apparatus comprises:
   a sync outputs to provide the horizontal-sync signal and the vertical-sync signal to the video source.

9. A system comprising:
   a video-timing generator;
   a video-data-processing pipeline; and
   a video source;
   the video-timing generator to:
      generate a data-valid signal; and
      provide the data-valid signal to the video source;
   the video source to:
      provide video data to the video-data-processing pipeline; and
      provide the data-valid signal, or the data-valid signal as delayed by the video source, to the video-data-processing pipeline;
   the video-data-processing pipeline to:
      process the video data;
      provide the processed video data to a display;
      delay the data-valid signal provided by the video source; and
      provide the delayed data-valid signal to the video-timing generator, the delayed data-valid signal a replica of the data-valid signal delayed by latency of the video-data processing pipeline;
   the video-timing generator to:
      generate a delayed horizontal-sync signal and a delayed vertical-sync signal at least partially responsive to the delayed data-valid signal; and
      provide the delayed horizontal-sync signal, the delayed vertical-sync signal, and the delayed data-valid signal to the display.

10. The system of claim 9, wherein the video-timing generator to provide the delayed data-valid signal to the display.

11. The system of claim 9, wherein the video-timing generator to generate a horizontal-sync signal and a vertical-sync signal and to provide the horizontal-sync signal and the vertical sync signal respectively to the video source.

12. The system of claim 9, wherein video processors of the video-data-processing pipeline to not include a circuit to handle any of the horizontal-sync signal, the vertical-sync signal, the delayed horizontal-sync signal and the delayed vertical-sync signal.

13. The system of claim 9, wherein the video-data-processing pipeline to delay the data-valid signal by a duration related to the processing of the video data.

14. The system of claim 11, wherein the video source to not provide the horizontal-sync signal and the vertical sync signal respectively to video processors of the video-data-processing pipeline.

15. The system of claim 11, wherein video processors of the video-data-processing pipeline to not receive any of the horizontal-sync signal, the vertical-sync signal, the delayed horizontal-sync signal and the delayed vertical-sync signal.

16. A method comprising:
providing a data-valid signal to a video source, the video source to provide video data to a video-data-processing pipeline;
receiving a delayed data-valid signal from the video-data-processing pipeline, the delayed data-valid signal a replica of the data-valid signal delayed by latency of the video-data-processing pipeline; and
generating a delayed horizontal-sync signal and a delayed vertical-sync signal at least partially responsive to receiving the delayed data-valid signal.

17. The method of claim 16, comprising providing the delayed horizontal-sync signal and the delayed vertical-sync signal to a display.

18. The method of claim 16, comprising providing the delayed data-valid signal to a display.

19. The method of claim 16, comprising: providing a horizontal-sync signal and a vertical-sync signal to the video source.

20. The method of claim 16, comprising:
providing video data from the video source to video processors of the video-data-processing pipeline; and
providing the data-valid signal, or the data-valid signal as delayed by the video source, from the video source to video processors of the video-data-processing pipeline.

21. The method of claim 16, comprising:
processing the video data at the video-data-processing pipeline;
providing the processed video data from the video-data-processing pipeline to a display;
delaying the data-valid signal by the video-data-processing pipeline; and
providing the delayed data-valid signal from the video-data-processing pipeline to a video-timing generator, the video-timing generator generating the delayed horizontal-sync signal and the delayed vertical-sync signal.

* * * * *